Sept. 4, 1962 E. W. HEROLD 3,052,614
FREQUENCY CONTROL OF RF HEATING OF GASEOUS PLASMA
Filed Nov. 17, 1960

INVENTOR.
Edward W. Herold
BY
Edward J. Norton
Attorney

United States Patent Office 3,052,614
Patented Sept. 4, 1962

3,052,614
FREQUENCY CONTROL OF RF HEATING
OF GASEOUS PLASMA
Edward W. Herold, Atherton, Calif., assignor, by mesne assignments, to the United States of America as represented by the United States Atomic Energy Commission
Filed Nov. 17, 1960, Ser. No. 70,016
2 Claims. (Cl. 204—193.2)

The invention relates to improved methods of and means for heating gaseous plasma and more particularly to an arrangement for obtaining the best or at least an improved radio frequency for plasma heating so as to provide the maximum rate of heating.

Several research devices have been devised for studying effects in and properties of high temperature plasmas and for production of thermonuclear reactions. In such devices, it is necessary that the plasma be raised to a high temperature. The plasmas generally comprise deuterium or tritium or mixtures of the two.

In one type of plasma heating, the magnetic field is caused to pulsate at a radio frequency and produce, by induction, an electric field in the plasma transverse to the magnetic field. When, for example, the magnetic field is caused to pulsate at a frequency close to the ion cyclotron frequency, the heating method is called "ion cyclotron resonance heating." A description of this method of heating is presented by T. H. Stix and R. W. Palladino in the Proceedings of the Second United Nations Conference on the Peaceful Uses of Atomic Energy, September 1 to 13, volume 31.

In bringing a controlled fusion plasma up to thermonuclear temperatures, the choice of radio frequency for heating is an important factor. The radio frequency should be selected so as to come close to and keep in step with some natural resonance of the plasma. However, these resonances are not fixed frequencies. The cyclotron resonance frequency referred to above depends on the resultant magnetic field which, in turn, depends on the direct current in the plasma, the applied magnetic field, and the prior history of the plasma configuration and temperature.

It is an object of the invention therefore to provide an improved method and means for controlling the heating of gaseous plasmas.

Another object is to provide improved method and means for obtaining frequency control of the radio frequency heating of a gaseous plasma.

A still further object is to provide an improved method and means for automatically controlling the frequency of an induction heater for gaseous plasma so as to maximize the rate of heating.

Briefly, the above objects of the invention are accomplished in accordance with typical embodiments of the invention by a servo-loop system in which a small cyclical frequency deviation is used to "feel" or sense the direction of plasma temperature with frequency. The system, in effect, indicates whether the plasma temperature is going up or down when the heating frequency is changed. The sensing signal is compared in a phase comparator with a component of a temperature-sensitive signal from the plasma. A control signal derived from the phase comparator is used to set the center frequency of the radio frequency energy employed to heat the gaseous plasma.

A more detailed description of the invention will now be given with the assistance of the accompanying drawing in which.

In the drawing, similar elements are identified by similar reference characters.

Figure 1:
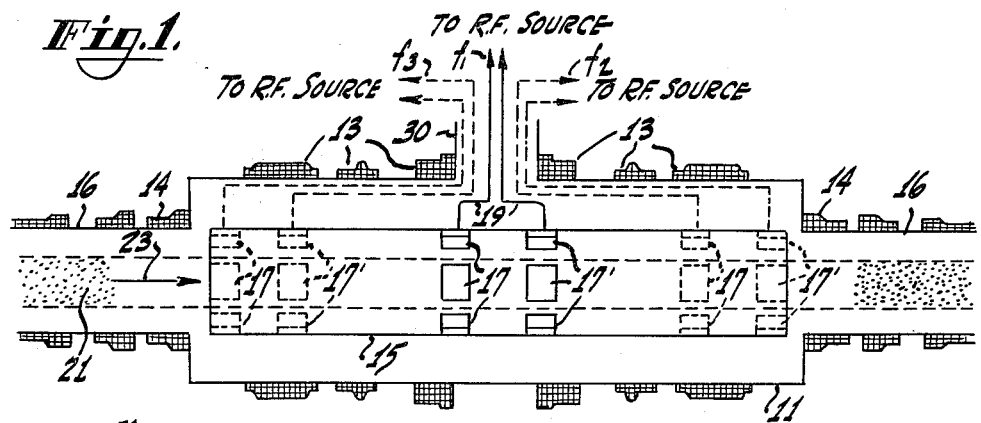
FIGURE 1 is a partially schematic sectional view of one example of a gas plasma device of the type with which the present invention is intended for use.

In the gas plasma device shown in FIGURE 1 for illustrative purposes only, the resonance box is patterned after the type employed in a typical stellarator, such as described in the Stix et al. publication, cited above. The elements of the box include, for example, a non-magnetic cylindrical housing 11 slightly over 21 inches in length. Surrounding the housing 11 are a plurality of magnetic field producing windings 13. Within the housing 11 there is mounted a ceramic tube 15, 21 inches long and 4 inches in diameter, which defines a plasma reaction zone. The windings 13 are designed to produce a uniform confining field over a length of about 18 inches. Additional windings 14 are provided at each end of the ceramic tube 15 to produce mirror fields of a 3–2 mirror ratio at each end of the ceramic tube 15. In a stellarator, the resonance box of FIG. 1 is coupled into an endless toroid or race track (not shown), plasma being injected into and withdrawn from the resonance box via 4 inch diameter tubular sections 16 connected to either end of the resonance box. As shown on page 284 of the above mentioned article by Stix et al., an additional coil is provided to which radio frequency is applied to produce a pulsating magnetic field which causes heating of the plasma.

Figure 2:
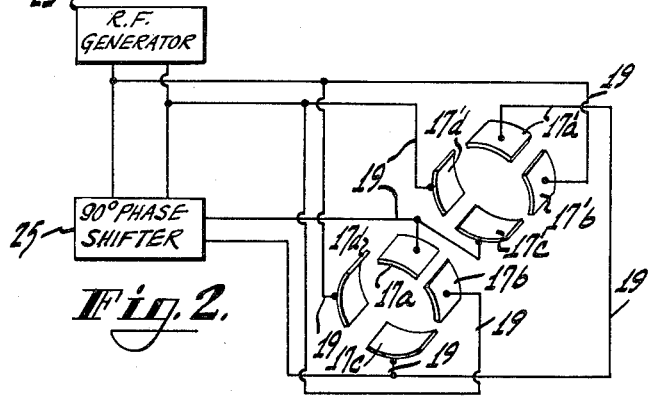
FIGURE 2 is a schematic perspective view illustrating two adjacent sets of adjacent electrode structures shown in FIGURE 1 and a radio frequency circuit for feeding radio frequency energy of appropriate frequency and phase to the electrode structure.

As illustrated in FIGURES 1 and 2, the heating means comprises a plurality of electric field generating means mounted within the ceramic tube 15. Each means comprises a plurality of arcuate electrodes 17 and 17' equally spaced around the inner surface of the ceramic tube 15. RF energy is fed to the electrodes by means of leads 19, which may be, for example, conventional coaxial transmission lines, passing through one or more vacuum sealed entry ports 20 in the housing 11.

During operation, the confining field windings 13 are energized to produce a strong axial magnetic field of the order of 20,000 to 50,000 gauss. A column of plasma 21 is then injected into the ceramic tube 15 in the direction shown by the arrow 23. This may be accomplished, for example, in the manner set forth in U.S. Patent 2,910,414 to Lyman Spitzer, Jr. Preferably the plasma 21 is as fully ionized as possible. The plasma may comprise, for example, deuterium or tritium ions, or mixtures thereof, and electrons separately orbiting about the magnetic lines of force in a helical path.

The plasma 21 is confined by the magnetic field in a compact column isolated from the inner surface of the ceramic tube 15 and the electrodes 17. A circuit for feeding RF energy to one set of electrodes 17 is shown in FIGURE 2. For conveniece, electrodes 17 and 17' are respectively numbered 17a, 17b, 17c, 17d, and 17a', 17b', 17c', 17d' in FIGURE 2. One pair of oppositely disposed electrodes 17b and 17d are fed 180° out of phase directly from an RF generator 23. In the same manner, RF energy is applied to the other pair of electrodes 17a and 17c but since they are fed from the generator 23 through a conventional 90° phase shifter 25, each electrode is fed 90° out of phase with respect to the next adjacent electrode. In this manner, a circularly polarized electric field is established within the ceramic tube 15.

Power requirements for creating the circularly polarized fields may range as high as 20 kw. Suitable RF generators are described in "Induction and Dielectric Heating," by J. W. Cable, 1954, Rheinhold Publishing Co., New York, New York. The plasma resonance and, therefore, the frequency of the energy supplied by the generator 23 may shift appreciably in the manner described. The shifter 25 preferably in a 90° phase shift lumped circuit. Lumped circuits with wide-band 90° phase shifts are known. Waveguide or coaxial line arrangements may be used in other applications according to the frequency, method of heating, and so on.

In FIGURE 2, two sets of electrodes 17 and 17' are shown connected to the RF generator 23 and to the 90° phase shifter 25. The first set of electrodes 17a—17d are fed with RF energy as described heretofore so that the potentials on adjacent electrodes are 90° out of phase to establish a circularly polarized electric field. The next axially adjacent set of electrodes 17a'—17d' are fed in the same manner, however the instantaneous potential on each electrode 17a'—17d' is caused to be 180° out of phase with the corresponding electrode of the first set of electrodes 17a—17d.

The arrangement shown in FIGURES 1 and 2 makes use of the fact that, while electrons cannot be moved radially in this arrangement, they can be moved in an axial direction. The sets of electrodes 17 and 17' produce two radial fields out of phase with respect to each other and transverse to the axis of the column of plasma. When the uppermost electrode 17a' of the second set of electrodes 17' is positive, an excess of electrons is created in the plasma adjacent to this electrode 17a'. These electrons are attracted by the positive space charge created near the uppermost electrode 17a of the first set of electrodes 17. Upon reaching the positive space charge region of the plasma the electrons neutralize that charge and permit the externally applied electric field to penetrate the plasma and transfer energy to the ions therein.

In each of the transverse electric fields, ions are moved radially to the negative portion of the fields leaving an excess of electrons in the positive portion of each field. These electrons "feel" the positive space charge created by the ions in the adjacent field and are axially attracted thereto. The axial movement of electrons results in neutralization of the positive space charge and permits penetration of the externally applied fields into the plasma to promote heating of the ions therein.

The frequency of the RF energy applied to the electrodes 17 and 17' will depend on what type of ions in the gaseous plasma are to be heated and upon the intensity of the magnetic confining field. For example, when deuterium ions are to be heated and the confining field has an intensity of 20,000 gauss, the cyclotron resonance frequency is 15 mc. Hence, RF energy at about the same frequency will be applied to the electrodes. If the field intensity is 50,000 gauss, a frequency of about 37.5 mc. will be employed. The frequency with respect to tritium at 20,000 gauss will be about 10 mc. and at 50,000 gauss will be about 25 mc.

In the operation of a device of the type shown in FIGURES 1 and 2, the frequency of the radio frequency energy used to heat the plasma should be close to the selected natural resonance of the plasma ions. In practice, this natural resonance is not a fixed frequency but varies according to various factors as indicated above. In order to maximize the rate of heating, the radio frequency must be controlled during the time of heating so as to keep in step with the particular resonance being used, for example, the cyclotron resonance.

Figure 3:
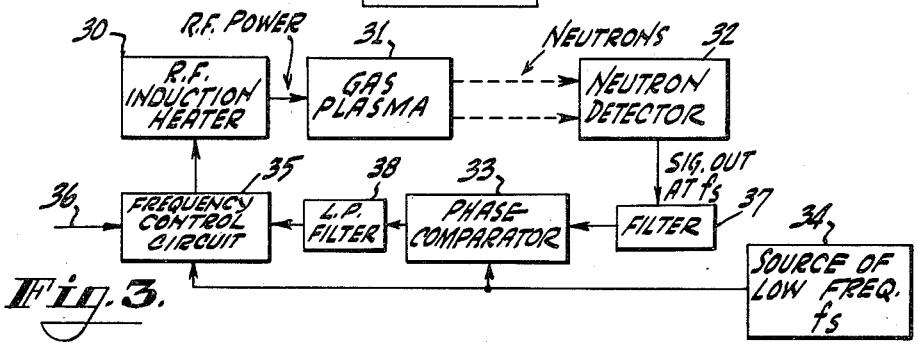
FIGURE 3 is a block diagram of one embodiment of a servo-loop system to be used according to the invention with a gas plasma device of the type shown in FIGURES 1 and 2.

One embodiment of a servo-loop system employed according to the invention to effect this frequency control is shown in FIGURE 3. A radio frequency (RF) induction heater 30 supplies RF power to heat a gas plasma 31. The heater 30 and plasma 31 may be as shown in FIGURES 1 and 2, for example. Since, in a thermonuclear plasma, the neutron output is a sensitive measure of temperature, it may be used as an indicator. As will become evident, any one of a number of indicators providing a sensitive measure of temperature other than the neutron output may be used.

In the arrangement of FIGURE 3, a neutron detector 32 detects the neutron output of the gas plasma 31 and applies a signal to a phase comparator 33 through a suitable filter 37 which passes substantially only the fundamental frequency component of the signal. A low frequency signal of frequency $f_s$ is applied from a suitable source 34 to the phase comparator 33 and to a frequency control circuit 35. A direct current control signal derived from the phase comparator 33 is also fed to the control circuit 35 over a path which includes a low-pass filter 38 for removing alternating current components from the control signal. The output of the control circuit 35 is applied to the RF induction heater 30 to determine the frequency of the RF power applied to the gas plasma 31. A third input 36 to the control circuit 35 is provided to permit a rough setting of the servo-loop to provide approximately the correct RF heating frequency, whereby the servo-loop can thereafter automatically determine the correct RF operation frequency. An example of a suitable control circuit is a reactance tube circuit coupled to the RF induction heating generator 30, the reactance being responsive to voltages from the low frequency source 34, the output of the phase comparator 33, and if desired, the manual bias control 36.

Figure 4A:
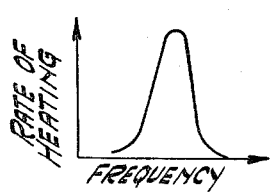
FIGURES 4a and 4b are curves useful in describing the operation of the servo-loop system shown in FIGURE 3.

As an example of the operation of the system, it will be assumed that the plasma 31 has the heating characteristics of the curve shown in FIGURE 4a. The input 36 to the frequency control circuit 35 is adjusted, for example, by manual bias voltage control means so that the control signal applied to the heater 30 from the control circuit 35 results in a setting of the radio frequency at approximately the correct frequency, i.e. at the peak rate of heating as shown in the curve of FIGURE 4a. Alternatively, the tuning of the RF induction heating oscillator 30 may be manually adjusted. The signal of low-frequency $f_s$ supplied to the control circuit 35 from the low frequency source 34 causes the radio frequency applied to the plasma 31 to be altered up and down rapidly enough to leave the mean plasma temperature rising at an unaltered rate, depending on the average rate of plasma heating.

As the center frequency of the radio frequency energy differs from the resonance of the plasma 31, a corresponding change in temperature, and consequently the neutron output, occurs. This change is reflected in the signal output of detector 32. At a condition of plasma resonance, only the fundamental component of the signal from detector 32 passes through zero. The signal from detector 32 is all second harmonic. In the absence of an input to the comparator 33 from filter 37, no output occurs from the comparator 33. Below the frequency of resonance, one phase of the fundamental component in the signal from detector 32 occurs. Above resonance, the opposite phase of the fundamental component occurs. These two signal conditions are comparable in amplitude.

Figure 4B:
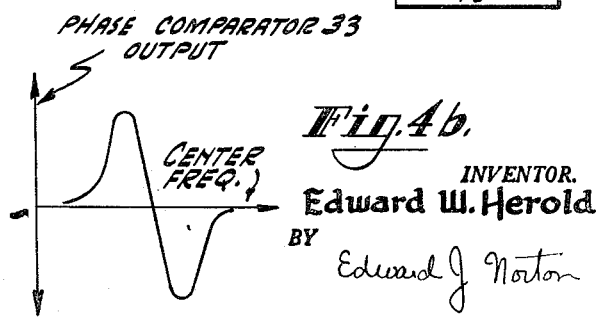

The phase comparator 33 is responsive to one phase of the fundamental component to produce a positive control signal for application to the control circuit 35. The opposite phase of the fundamental component results in the production by the comparator 33 of a negative control signal. A typical control signal output from comparator 33 is shown in FIGURE 4b.

The conventional phase comparator 33 functions to provide a direct current control signal according to the phase difference between a first and a second alternating current signal applied thereto. It is important that the connection for the control signal from the comparator 33 to the control circuit 35 be completed with attention being given to the correct polarity. Should the control signal be applied to the control circuit 35 in the incorrect polarity, the frequency of the energy supplied by heater 30 will be driven too high or too low instead of being placed at the desired center.

The output of the phase comparator 33 is zero, when the fundamental component of the detector 32 output is zero at the correct center frequency. When the radio frequency is too low, the output of the comparator 33 is of one polarity, causing the control signal from the control circuit 35 to effect a rise in the RF heating frequency. When the radio frequency is too high, the output of the comparator 33 is of the opposite polarity, and the frequency is lowered by the control signal from the control circuit 35.

By the above operation, the radio frequency supplied by heater 30 will, as the plasma heats up, track in frequency to cause substantially maximum heating, no matter what causes the change in plasma resonance. The servo-loop controls the mean radio frequency so as to hold it substantially at that frequency which produces the greatest increase in neutron output at all times. If needed, additional amplification may be provided in the servo-loop.

In describing the invention, a single heating stage has been assumed. Actually, a plurality of heating stages may be provided, as indicated by the dotted lines in FIGURE 1. The plurality of heating stages may all be operated at the same frequency or at different frequencies, $f_1$, $f_2$, and $f_3$, with a separate RF generator and delay structure for each heating stage. Thus, if a plasma made up of a mixture of deuterium and tritium is to be heated, one heating stage can be operated at the deuterium resonance frequency and another at the tritium resonance frequency, thereby providing for maximized heating of all the ions in the plasma. Each radio frequency is controlled by a servo-loop system of the invention during the time of heating so that it keeps in step with the corresponding resonance of the plasma.

The principles of the invention are applicable to gas plasma devices not necessarily concerned with controlled fusion. For example, it is possible to obtain atomic nitrogen from molecular nitrogen in an RF gas discharge. When atomic nitrogen is frozen into a solid at very low temperature, it remains in the atomic state for long periods of time, until it is allowed to warm up. Thereafter, it releases a great deal of energy (10 e.v. per atom) and is useful fuel for rockets, and so on. Frozen atomic nitrogen can be obtained by a gas plasma heated by radio frequency, followed by a cold trap to freeze out the dissociated nitrogen.

To use the radio frequency heating to best advantage, it is desirable to alter the radio frequency as the plasma conditions change. By substituting an indicator of the atomic nitrogen content for the neutron detector 32 of FIGURE 3, this can be done by the servo-loop system of the present invention. A mass-spectrograph can be connected to the gas discharge vessel and set up to indicate atomic nitrogen. The spectrograph can be made to provide an electrical output at frequency $f_s$, indicating by its phase and amplitude whether the radio frequency for heating should be raised or lowered. The servo-loop operates in the manner described in connection with the embodiment of FIGURE 3.

The invention is useful in every instance where an electrical signal output can be obtained which indicates the quantity of the desired result. Dissociation of gas is one example, and new molecular combinations is a further example. Some molecules do not combine at low temperatures (i.e. silicon carbide) and can be caused to combine at high plasma temperatures. A mass-spectrograph can be used as the indicator of the desired compound formation.

There is often an advantage gained in the radio frequency heating of only the desired gas particles by best choice of frequency. For example, the cyclotron resonance of silicon and carbon can be used with separate controlled RF heaters to selectively heat them for molecular combination, without at the same time excessively heating the silicon carbide molecule. Any dissociation of this molecule results in a loss of some of the desired output material. A system for accomplishing such double-frequency heating would require only a separate servo-loop system as shown in FIGURE 3 for each radio frequency heater.

What is claimed is:

1. In a device for heating a gaseous plasma within a substantially cylindrical container, the combination of means for producing a substantially constant magnetic field directed along the axis of said container for confining said plasma, means for heating said plasma with radio frequency energy including first and second groups of electrodes positioned on said cylinder and spaced along the longitudinal axis of the container, each group including a plurality of electrodes positioned about the circumference of said container and equally spaced at a predetermined angle with respect to each other from said axis, energy supplying means including a radio frequency source and phase shift means connected to both said first and second groups of electrodes and to all of said electrodes within each group for supplying to each of the electrodes in any one group radio frequency energy of different phase in proportion to their predetermined displacement angle within the group and in which the phase supplied to any electrode of one group is displaced 180° from the phase supplied to a similarly positioned electrode of the other group whereby two rotating radio frequency electric fields are produced along the longitudinal axis and transverse thereto which are phase displaced 180° with respect to each other, means for supplying a first signal to said energy supplying means to cause said radio frequency to be altered up and down rapidly enough to leave the mean temperature of said plasma rising at an unaltered rate depending upon the average rate of heating, means coupled to said plasma and responsive to the neutron output of said plasma for producing a second signal indicative of the difference between the frequency of said radio frequency energy and a selected resonance frequency of said plasma, a comparator responsive to said first and second signals for producing a control signal, and means to apply said control signal to said energy supplying means to maintain the frequency of said energy substantially at said resonance frequency.

2. A combination as in claim 1 further including third and fourth groups of heating electrodes positioned on said cylinder along the axis of tube and displaced from said first and second groups, and means for connecting said third and fourth groups of electrodes to said radio frequency source in the same manner as the first and second groups were connected to thereby provide additional heating.

References Cited in the file of this patent

UNITED STATES PATENTS 2,745,014    Norton _____ May 8, 1956

OTHER REFERENCES

NYO–7899 U.S. Atomic Energy Commission: The Proposed Model C Stellarator Facility, Aug. 29, 1957, pp. 472, 473, 297, 298, 362–370.